US012581270B2

(12) United States Patent
Choukir et al.

(10) Patent No.: US 12,581,270 B2
(45) Date of Patent: Mar. 17, 2026

(54) MANAGED NETWORK SUPPORTING BACKSCATTERING COMMUNICATION DEVICES

(71) Applicant: Cisco Technology, Inc., San Jose, CA (US)

(72) Inventors: Amine Choukir, Lausanne (CH); Domenico Ficara, Essertines-sur-Yverdon (CH); Pascal Thubert, Roquefort-les-Pins (FR); Leo Caldarola, Morrens (CH); Mathieu Monney, Bussigny (CH); Arun G. Khanna, Sunnyvale, CA (US); Jerome Henry, Pittsboro, NC (US)

(73) Assignee: Cisco Technology, Inc.

( * ) Notice: Subject to any disclaimer, the term of this patent is extended or adjusted under 35 U.S.C. 154(b) by 532 days.

(21) Appl. No.: 17/932,901

(22) Filed: Sep. 16, 2022

(65) Prior Publication Data

US 2024/0098454 A1 Mar. 21, 2024

(51) Int. Cl.
| | |
|---|---|
| *H04W 4/029* | (2018.01) |
| *H04B 7/22* | (2006.01) |
| *H04B 17/336* | (2015.01) |
| *H04W 88/08* | (2009.01) |

(52) U.S. Cl.
CPC .............. *H04W 4/029* (2018.02); *H04B 7/22* (2013.01); *H04B 17/336* (2015.01); *H04W 88/08* (2013.01)

(58) Field of Classification Search
CPC ..... H04W 4/029; H04W 48/20; H04W 88/08; H04B 7/22; H04B 17/336
See application file for complete search history.

(56) References Cited

U.S. PATENT DOCUMENTS

| | | | | |
|---|---|---|---|---|
| 7,898,391 | B2 * | 3/2011 | Maguire | G06K 7/10356 340/10.2 |
| 10,448,211 | B1 * | 10/2019 | Shen | G06K 7/10366 |
| 2006/0274776 | A1 * | 12/2006 | Malik | H04B 7/00 370/445 |
| 2008/0143482 | A1 * | 6/2008 | Shoarinejad | G01S 7/003 340/8.1 |

(Continued)

FOREIGN PATENT DOCUMENTS

WO 2021163480 A1 8/2021

OTHER PUBLICATIONS

Notification of Transmittal of the International Search Report and the Written Opinion issued in International Patent Application No. PCT/US2023/074389, mailed Mar. 28, 2024 (19 pages).

(Continued)

*Primary Examiner* — James P Duffy
(74) *Attorney, Agent, or Firm* — Merchant & Gould P.C.

(57) ABSTRACT

A managed network supporting backscattering communication devices may be provided. A computing device may determine a plurality of locations respectively associated with a plurality of devices in a preterminal space. At least one of the plurality of devices may be power with energy transmitted from at least one Access Point (AP) to the least one of the plurality of devices at its location. Data may be received from the at least one of the plurality of devices in response to powering the at least one of the plurality of devices.

14 Claims, 11 Drawing Sheets

(56) References Cited

U.S. PATENT DOCUMENTS

| | | | |
|---|---|---|---|
| 2009/0147697 A1* | 6/2009 | Malik .................. | H04W 48/08 |
| | | | 370/254 |
| 2018/0212807 A1 | 7/2018 | Zhang et al. | |
| 2019/0158341 A1 | 5/2019 | Talla et al. | |
| 2020/0266669 A1* | 8/2020 | Paidimarri ............. | H02J 50/90 |
| 2021/0099198 A1 | 4/2021 | Reynolds et al. | |
| 2021/0194568 A1* | 6/2021 | Szczepanik ........... | H04B 7/088 |
| 2022/0167300 A1* | 5/2022 | Anderson ............. | H04W 64/00 |

OTHER PUBLICATIONS

Liu, Wanchun et al. "Next generation backscatter communication: systems, techniques, and applications" EURASIP Journal on Wireless Communications and Network; https://doi.org/10.1186/s13638-019-1391-7 (11 pages).

\* cited by examiner

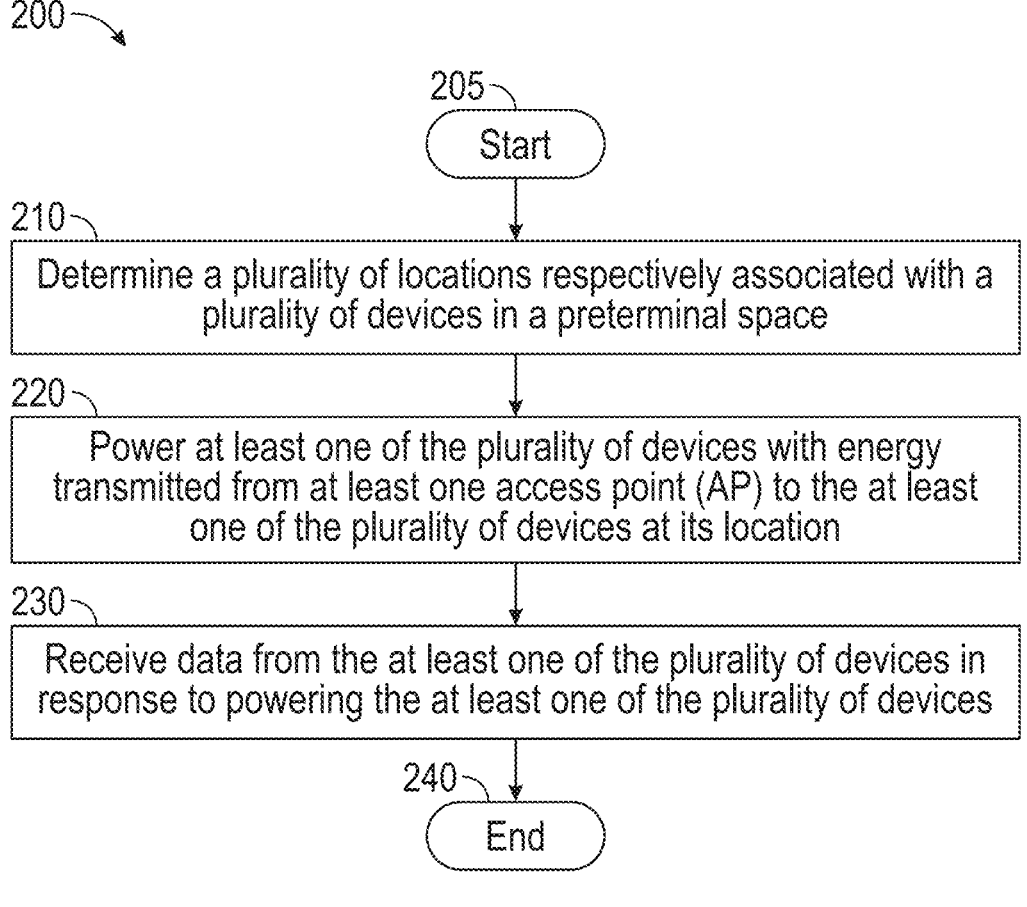

200

205

Start

210

Determine a plurality of locations respectively associated with a plurality of devices in a preterminal space

220

Power at least one of the plurality of devices with energy transmitted from at least one access point (AP) to the at least one of the plurality of devices at its location

230

Receive data from the at least one of the plurality of devices in response to powering the at least one of the plurality of devices

240

End

FIG. 2

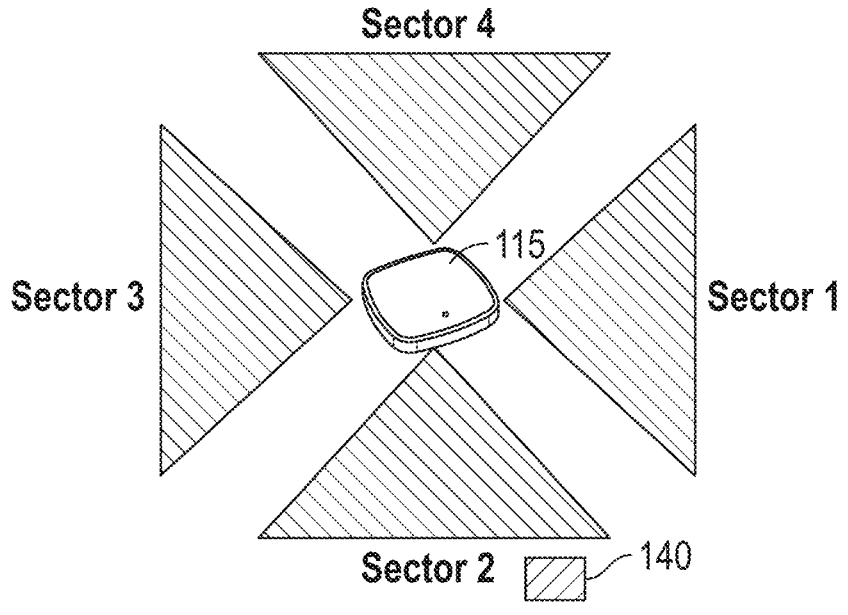
FIG. 3A
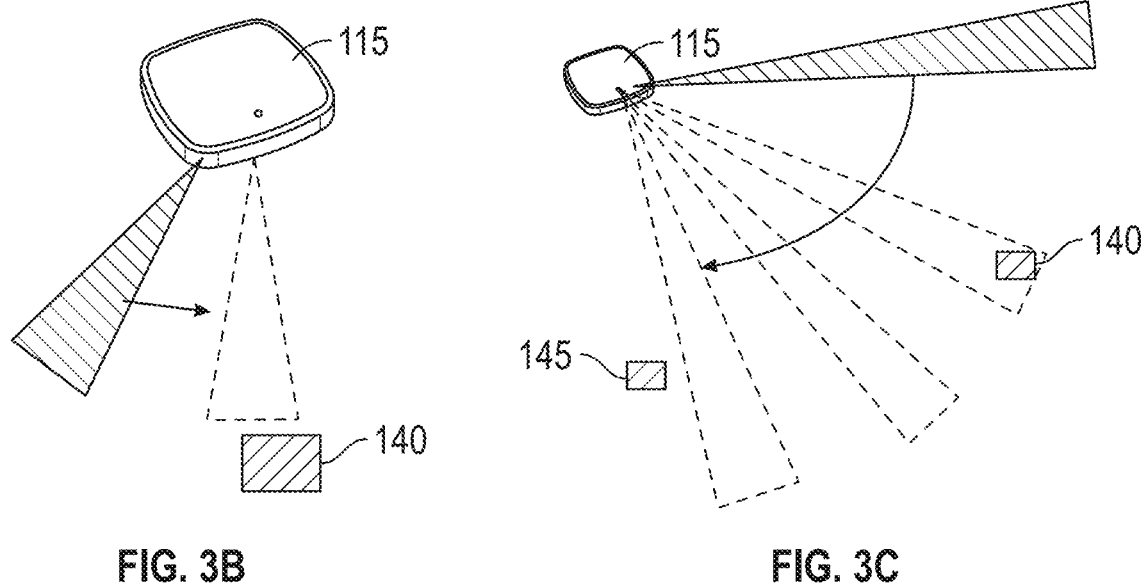
FIG. 3B                FIG. 3C

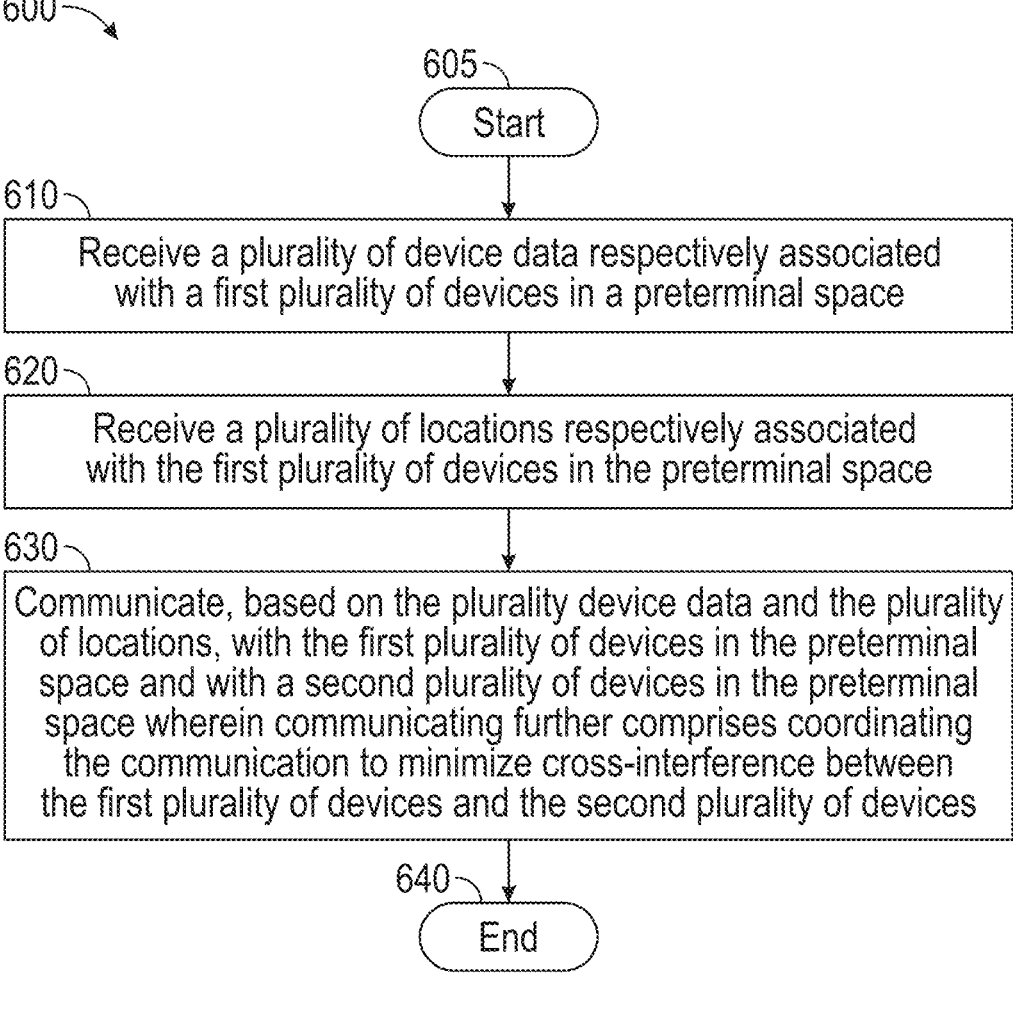

600

605 — Start

610 — Receive a plurality of device data respectively associated with a first plurality of devices in a preterminal space 620 — Receive a plurality of locations respectively associated with the first plurality of devices in the preterminal space 630 — Communicate, based on the plurality device data and the plurality of locations, with the first plurality of devices in the preterminal space and with a second plurality of devices in the preterminal space wherein communicating further comprises coordinating the communication to minimize cross-interference between the first plurality of devices and the second plurality of devices 640 — End

FIG. 6

MANAGED NETWORK SUPPORTING BACKSCATTERING COMMUNICATION DEVICES

TECHNICAL FIELD

The present disclosure relates generally to managed network supporting backscattering communication devices.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing a managed network supporting backscattering communication devices;

FIGS. 3A, 3B, and 3C illustrate hierarchical coordinated scanning;

FIG. 6 is a flow chart of a method for providing a managed network supporting backscattering communication devices;

DETAILED DESCRIPTION

Overview

Figure 1:
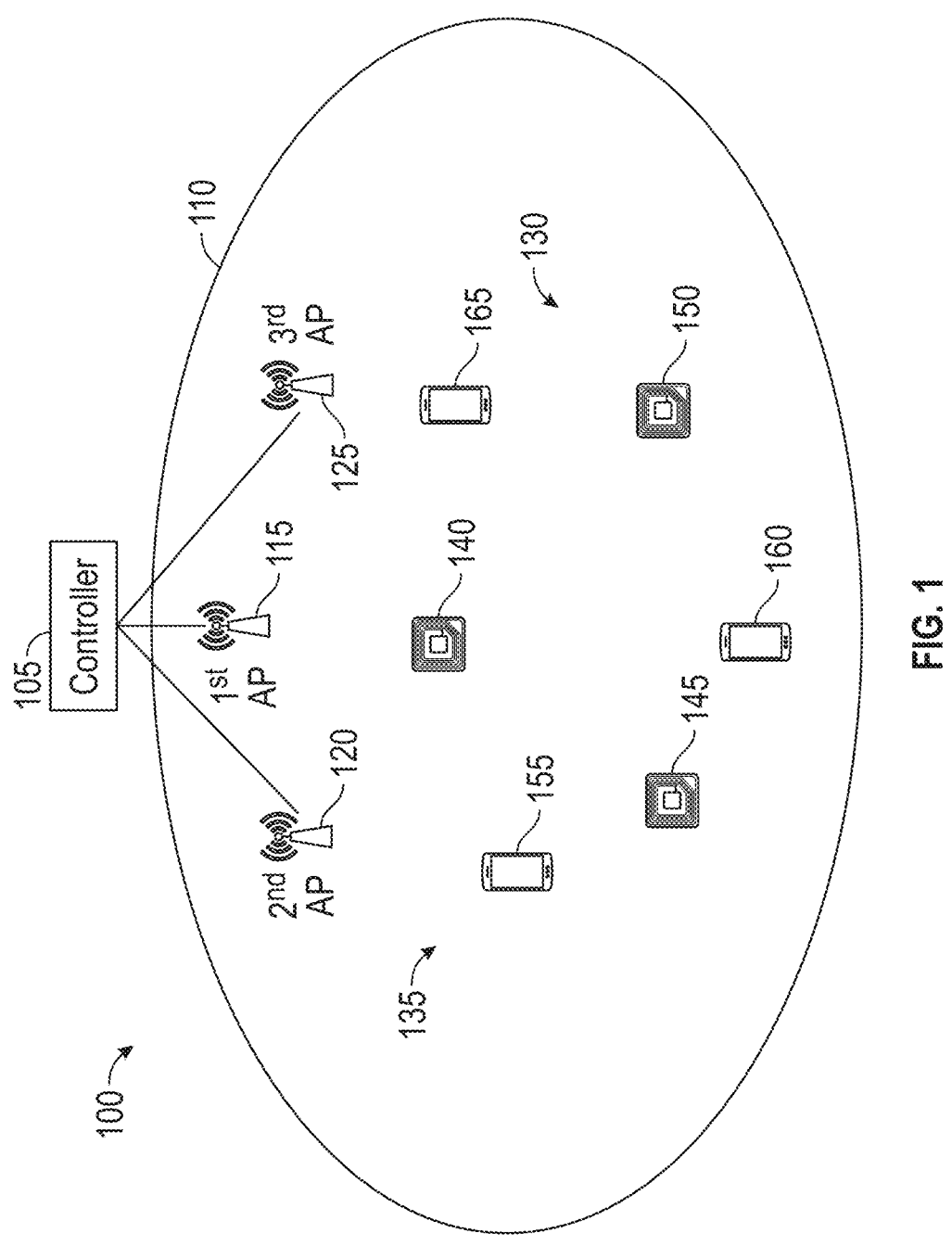
FIG. 1 is a block diagram of an operating environment for providing a managed network supporting backscattering communication devices.

A managed network supporting backscattering communication devices may be provided. A computing device may determine a plurality of locations respectively associated with a plurality of devices in a preterminal space. At least one of the plurality of devices may be power with energy transmitted from at least one Access Point (AP) to the least one of the plurality of devices at its location. Data may be received from the at least one of the plurality of devices in response to powering the at least one of the plurality of devices.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Backscatter Communication (i.e., BackCom) may use ambient or dedicated Radio Frequency (RF) energy to allow battery-less/very low-powered devices to communicate (e.g., at slow speed). For example, backscatter communication may be used for passive Radio Frequency Identification (RFID) tags. Internet-of-Things (IoT) sensors may be more and more ubiquitous, and they may be required to have battery power. This battery power requirement may increase maintenance costs. With backscatter communication, a sensor may be battery-less or use a very small battery that would last years and harvesting RF energy.

While backscatter communication may help solve the energy problem, it may also introduce new challenges related to the discovery of backscatter communication devices and the transmission of energy toward them to keep them powered. These challenges may include: i) wireless network infrastructure may have no knowledge about these devices and may not localize them (i.e., they may not be wireless client devices); ii) backscatter communication devices may depend on the wireless energy to be there when they need to communicate, which may not be a given (i.e., they may or may not have energy at any instant they are about to transmit); iii) backscatter communication devices may introduce some small noise to wireless network communication (i.e., in high density they may disrupt wireless client communications); and iv) delivering raw RF energy (e.g., to an RFID) may introduce noise to wireless networks.

Moreover, conventional systems may opportunistically harvest ambient RF energy to power battery-less or battery-powered (extending lifespan) devices. The opportunistic nature may not allow for the reliable management of the devices or to guarantee a minimum level of power for the device operation. Ad-hoc management may be acceptable in small settings, but may not scale. Accordingly, embodiments of the disclosure may manage and power backscatter communication devices, while avoiding their interference with the regular wireless client's operations.

Furthermore, backscatter communication devices may exist where wireless Access Points (APs) may be expected to provide directed energy to the backscatter communication devices. This expectation may not be realistic in the real world where many APs are expected to operate in a given environment, each of them with multiple Wi-Fi clients with activity that may not be disrupted by the backscatter communication transmissions. However, the backscatter communication transmissions may comprise interference to Wi-Fi devices, and thus may be disruptive in a linear relationship between the device density and their transmission times. Accordingly, embodiments of the disclosure may orchestrate Wi-Fi and backscatter communication transmissions that may allow coexistence with limited interferences.

FIG. 1 shows an operating environment 100 for providing a managed network supporting backscattering communication devices. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for devices. The plurality of APs may comprise a first AP 115, a second AP 120, and a third AP 125. Each of the plurality of APs may be compatible with specification standards such as, but not limited to, the Institute of Electrical and Electronics Engineers (IEEE) 802.11 specification standard for example.

A first plurality of devices 130 and a second plurality of devices 135 may be deployed in coverage environment 110. The plurality of APs may provide wireless network access to first plurality of devices 130 and second plurality of devices 135 as the plurality of client devices move within coverage environment 110. Coverage environment 110 may comprise an outdoor or indoor wireless environment for Wi-Fi or any type of wireless protocol or standard.

First plurality of devices 130 may comprise a first device 140, a second device 145, and a third device 150. First plurality of devices 130 may comprise backscatter communication devices, for example, RFID tags. First plurality of devices 130 may comprise, but are not limited to general energy harvesting devices and pure backscatter communication devices. General energy harvesting devices may comprise devices that work in two phases: i) first harvesting RF energy for a time period; then ii) transmitting using this harvested RF energy. General energy harvesting devices may comprise battery-less Bluetooth Low Energy (BLE) chips for example. With a pure backscatter communication device, the RF signal that provides power may also be the one that is backscattered/modified according to some modulation hence encoding some symbols of information.

Second plurality of devices 135 may comprise a first client device 155, a second client device 160, and a third client device 165. Ones of second plurality of devices 135 may comprise, but are not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide a managed network supporting backscattering communication devices.

The elements described above of operating environment 100 (e.g., controller 105, first AP 115, second AP 120, third AP 125, first device 140, second device 145, third device 150, first client device 155, second client device 160, and third client device 165) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 10, the elements of operating environment 100 may be practiced in a computing device 1000.

Discovery and Powering

FIG. 2 is a flow chart setting forth the general stages involved in a method 200 consistent with an embodiment of the disclosure for providing a managed network supporting backscattering communication devices. Method 200 may be implemented using a computing device 1000 as described in more detail below with respect to FIG. 10. Ways to implement the stages of method 200 will be described in greater detail below.

Method 200 may begin at starting block 205 and proceed to stage 210 where computing device 1000 may determine a plurality of locations respectively associated with first plurality of devices 130 in a preterminal space (e.g., coverage environment 110). For example, backscatter communication devices may be discovered by the following process: i) the definition of the space boundaries (i.e., coverage environment 110) to scan (e.g., AP searching for potential backscatter communication devices); ii) finding the power needed for backscatter communication devices to be able to at least identify themselves so the wireless infrastructure may more precisely locate them; and iii) locating candidate backscatter communication devices.

For the preterminal space definition, in one embodiment, a reference signal may be setup at different vertices of the volume for the plurality of APs to localize it. Each participating AP may record the reference signal and its location. In another embodiment, a combination of Visual Simultaneous Localization And Mapping (VSLAM) and RF measurement may be used. This may be akin to screen calibration where a user needs to touch targets on-screen, but different in the input signal being an RF signal setup in 3D space at the boundaries and measured through a grid of access points. In all cases, the infrastructure may record the signal reference positions, and may interpolate the intermediate untested spaces. Like in floor RF calibration, the infrastructure may provide feedback to an operator, to confirm if the test signal matches the projected value for this location, or if more signals at shorter intervals are needed.

The preterminal space definition may be infrequent, it may only need to happen if the space evolves when new APs are installed or replaced. Even in that case, incremental adaptive techniques may be put in place to mitigate the new boundary definition work, by using the existing APs measured signal for existing backscatter communication devices as compared to new APs installed.

Once the preterminal space is setup, the infrastructure may coordinate a sectorial sweep of the space through the plurality of APs. This may be achieved by a random or coordinated walk through all beamforming constellations on APs in the same area, collecting signal responses from backscatter communication devices, and thus ensuring that a minimum amount of power (or rather, an optimal amount of power beyond a Receive (RX) detection threshold) may be harvested by any device in the area. This may resemble the behavior of coordinated radars.

By scanning, the infrastructure may detect and locate (in the RF space) backscatter communication devices in the volume and their requirements including operating energy level (i.e., which constellation combinations, for each backscatter communication device, produces a usable signal response). While doing so, multiple levels of RF energy may be used in order to figure backscatter communication devices' minimal activation energy. An assumption here may be that a minimum level of energy may be supplied in a sectorial basis.

Hierarchical coordinated scanning may be used by embodiments of the disclosure. In one embodiment, APs may scan the volume they cover in coordinated phases. As illustrated by FIG. 3A, embodiments of the disclosure may divide the 360 degrees of a plane in four sectors of 90 degrees and scan each sector in different time slots. As illustrated by FIG. 3B, if the sector scan shows that some backscatter communication device has replied, then a second phase of finer-grain beam forming may be performed in more focused angles. As illustrated by FIG. 3C, this process of beam forming may be repeated with iteratively thinner beams until the desired degree of localization precision is obtained. According to the "illuminated" surface/volume, different levels of Transmit (TX) powers may be adapted, more when looking at sectors, less when looking at focused beams, in order to provide enough energy at the potential backscatter communication device within the sector/volume. This may give two degrees of freedom. At a given AP operating power level by reducing the size of the sector, embodiments of the disclosure may supply more power per surface area or given an area, embodiments of the disclosure may vary the TX power of the AP to ensure a certain power delivered per surface area. This may comprise a good property as it may allow a discovery phase that may broadly sweep the space to be served for identifying devices and their requirements as explained above and later by narrowly focusing an energy beam, the delivered energy may be increased to help in meeting the operating power requirements of the backscatter communication device.

Figure 4:
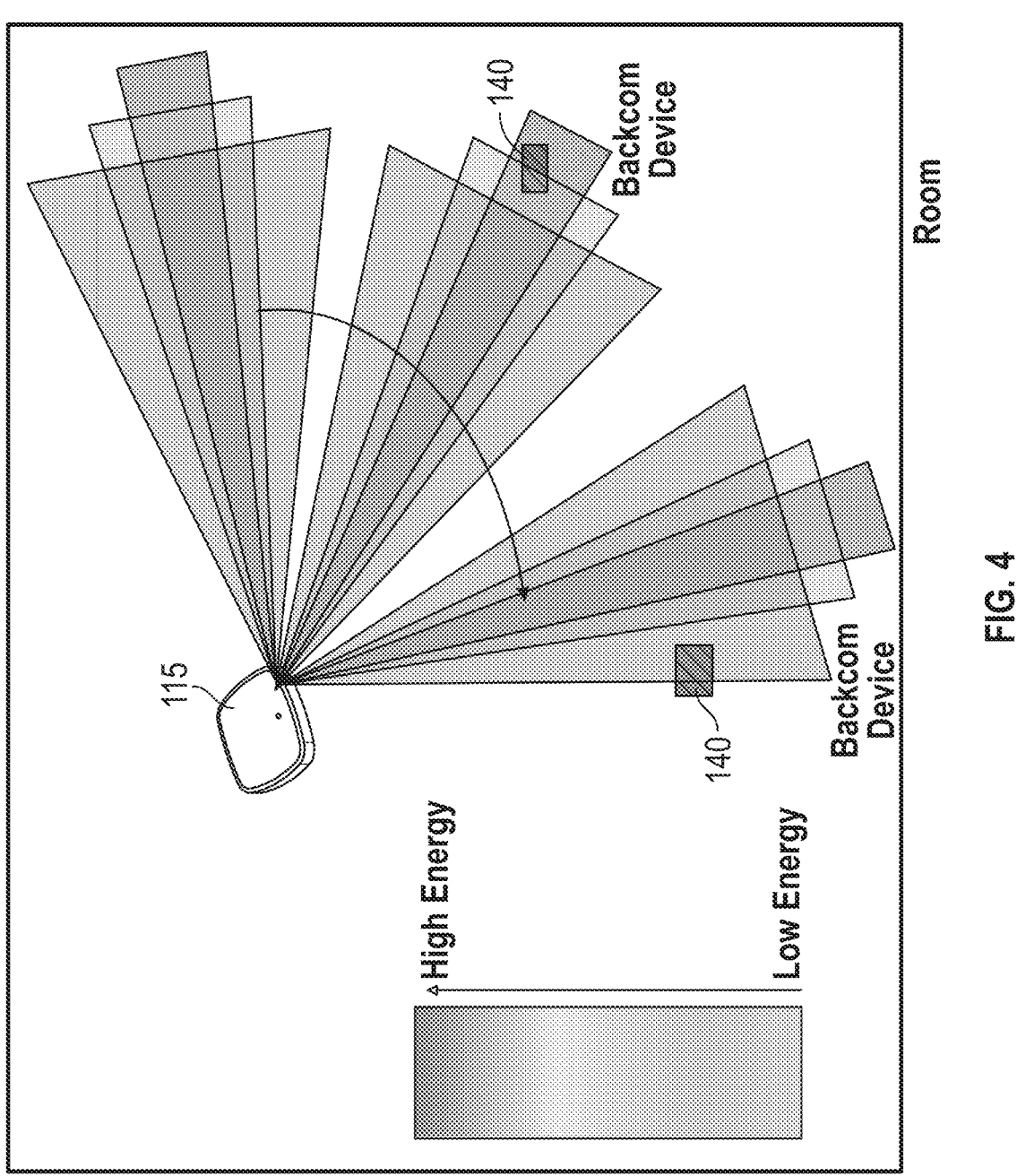
FIG. 4 illustrates scanning with various energy levels.

FIG. 4 illustrates another embodiment where the backscatter communication devices may have two levels of energy: i) a low level that may only allow for identification; and ii) a higher level for operation. The sectorial scanning may then be made to supply at least the low level of energy allowing device identification. Localization may be performed through multiple receiving APs. Whether through hierarchical scanning or supplying a base level of energy, the device identification may either explicitly or implicitly indicate the operating power level (by reacting or not to the AP signals). Once the different backscatter communication devices have been identified and located, the infrastructure may start coordinating their communications.

Figure 5:
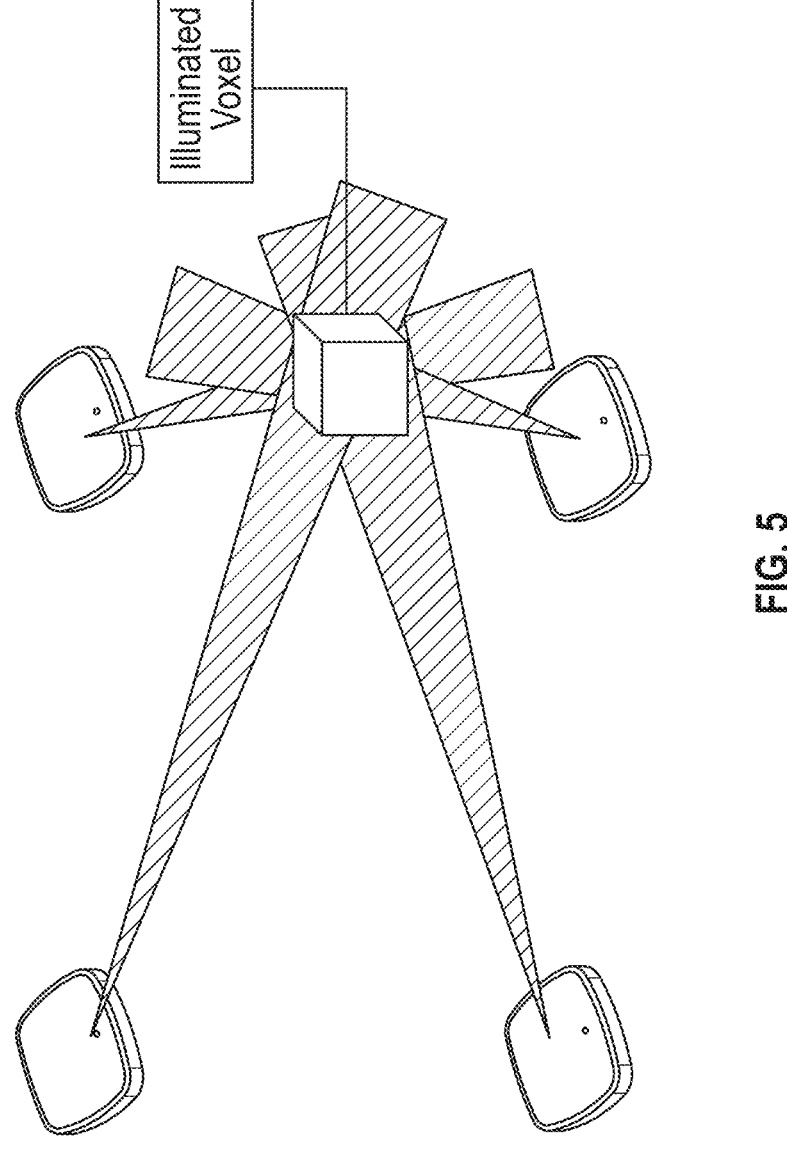
FIG. 5 illustrates coordinating different APs to scan a volume together.

In another embodiment as illustrated by FIG. 5, controller 105 may coordinate different APs to scan the volume together. If three APs are beamforming (with a focused or large "sector" beam) in the same area, their signal power in the "illuminated" volume element may be added up. The multi path may cause the energy of the radios to combine in a (partially or not) constructive or destructive way. A random walk exploration of beamforming combinations of all participating APs may allow the energy combinations to be tested in all locations of the volume. Similar to above, the infrastructure may then record which combination provides the backscatter response above the needed RX threshold. An advantage may be that each AP may provide ⅓rd of the power that a single AP would have sent to obtain the same RX power. Also, energy may be focused on a smaller volume (where the beams converge) as opposed to the totality of the volume of a single beam in the case of a single AP. This approach may simplify supporting RF power regulations and may be imagined as similar to the approach used in medicine for radiotherapy. In radiotherapy multiple beams of relatively low radio-power may converge on the small volume of a bad mass. This coordinated approach may be useful for scanning as well as backscatter communication device powering.

In another embodiment, controller 105 may coordinate also receiving APs together with the power-transmitting APs. Together with the choice of the APs that "trigger" a given volume element (voxel) with enough power, controller 105 may choose some APs that have to be listening in the same time slot if any device has reported back its presence. APs at the edge of a convex hull may be chosen to transmit, and APs inside the hull may be chose to listen, but this may be implementation-dependent.

While a full scanning operation may be performed rarely (e.g., because backscatter communication devices may not be mobile (e.g., attached to shelves or elements of the building), it may be repeated every now and then if the backscatter communication devices are expected to move. In another embodiment, controller 105 may use device-classification information about each backscatter device to understand if the backscatter communication device is fixed or mobile in nature. If the backscatter communication device is mobile, controller 105 may schedule scanning phases in the voxels close to the backscatter communication device accordingly, more or less frequently according to the device type.

From stage 210, where computing device 1000 determines the plurality of locations respectively associated with first plurality of devices 130 in the preterminal space (e.g., coverage environment 110), method 200 may advance to stage 220 where computing device 1000 may power at least one of the plurality of devices (e.g., first device 140) with energy transmitted from at least one Access Point (AP) (e.g., first AP 115) to the at least one of the plurality of devices (e.g., first device 140) at its location. For example, by using APs to understand the location and track backscatter communication devices, the network infrastructure may decide, at any given time, to "illuminate" a set of given x, y, z volume elements (i.e., voxels) where certain backscatter communication devices reside and therefore: i) power them; and ii) provide them with signal to backscatter hence easing their transmission task.

In other embodiments, backscatter communication devices may need energy before being able to speak, hence they may need an "illumination" phase before their transmission phase. Therefore, embodiments of the disclosure may produce a powering schedule to define when and how managed APs illuminate backscatter communication devices that may need to harvest energy in order to be able to talk latter. This powering schedule may have to provide enough power for each backscatter communication device (this may be known if the backscatter communication device is cooperating) for the forthcoming transmission phase:

$$\text{Energy}=f(Tx \text{ Time}*Tx \text{ power,backscatter device parameters})$$

For example, a backscatter communication device in its position may be able to harvest 0.1 µW of power when the transmitted energy illuminates the backscatter communication device with 10 mW TX power (10 dBm). This backscatter communication device may need 10 µW to transmit one frame, and a frame transmission may take 2 ms. The backscatter communication device may have to send 5 frames in the next minute. The backscatter communication device may need 10e–6 W*2e–3=20e–9 J=20 nJ of energy for each frame, hence 0.1 µJ for the whole transmission. Consistent with embodiments of the disclosure, 5 APs may be used to transmit at 10 dBm to illuminate the backscatter device for 20 ms each and obtain the needed energy: 5 APs*1e–6 W*20e–3=0.1 µJ.

In other embodiments, given the above considerations on energy needs that may be satisfied even earlier than the device transmission time, the APs may use the regular Wi-Fi transmissions used for client devices and compute, for each device, the amount of harvested energy and only schedule a powering phase to cover for the power gap needed, if any. In yet other embodiments, in a controlled environment, such as some particular areas of production factories or industries, RF levels may be controlled and network administrators may define policies to enable/disable backscatter communication devices by allowing/disallowing enough RF energy to reach them and with different variants, including, but not limited to: i) according to location; ii) according to time of the day or week; and iii) according to device type. Even if RF levels are not controlled, because power and reception may be performed by the network, the same management policies may be defined by administrators.

Once computing device 1000 powers the at least one of the plurality of devices (e.g., first device 140) with energy transmitted from the at least one AP (e.g., first AP 115) to the at least one of the plurality of devices (e.g., first device 140) at its location in stage 220, method 200 may continue to stage 230 where computing device 1000 may receive data from the at least one of the plurality of devices (e.g., first device 140) in response to powering the at least one of the plurality of devices (e.g., first device 140). For example, first device 140 may transmit the data after being illuminated by first AP 115 or after first device 140 has harvested enough energy to be able to transmit a signal. One of the plurality of APs may receive the data and forward it to controller 105. Once computing device 1000 receives the data from the at least one of the plurality of devices (e.g., first device 140) in response to powering the at least one of the plurality of devices (e.g., first device 140) in stage 230, method 200 may then end at stage 240.

Separation and Reception

FIG. 6 is a flow chart setting forth the general stages involved in a method 600 consistent with an embodiment of the disclosure for providing a managed network supporting backscattering communication devices. Method 600 may be implemented using a computing device 1000 as described in more detail below with respect to FIG. 10. Ways to implement the stages of method 600 will be described in greater detail below. Method 600 may provide a coordinated network infrastructure to allow backscattering communication devices and Wi-Fi devices to co-exist, thus maximizing backscattering transmission rates and minimizing interferences for example.

Figure 7:
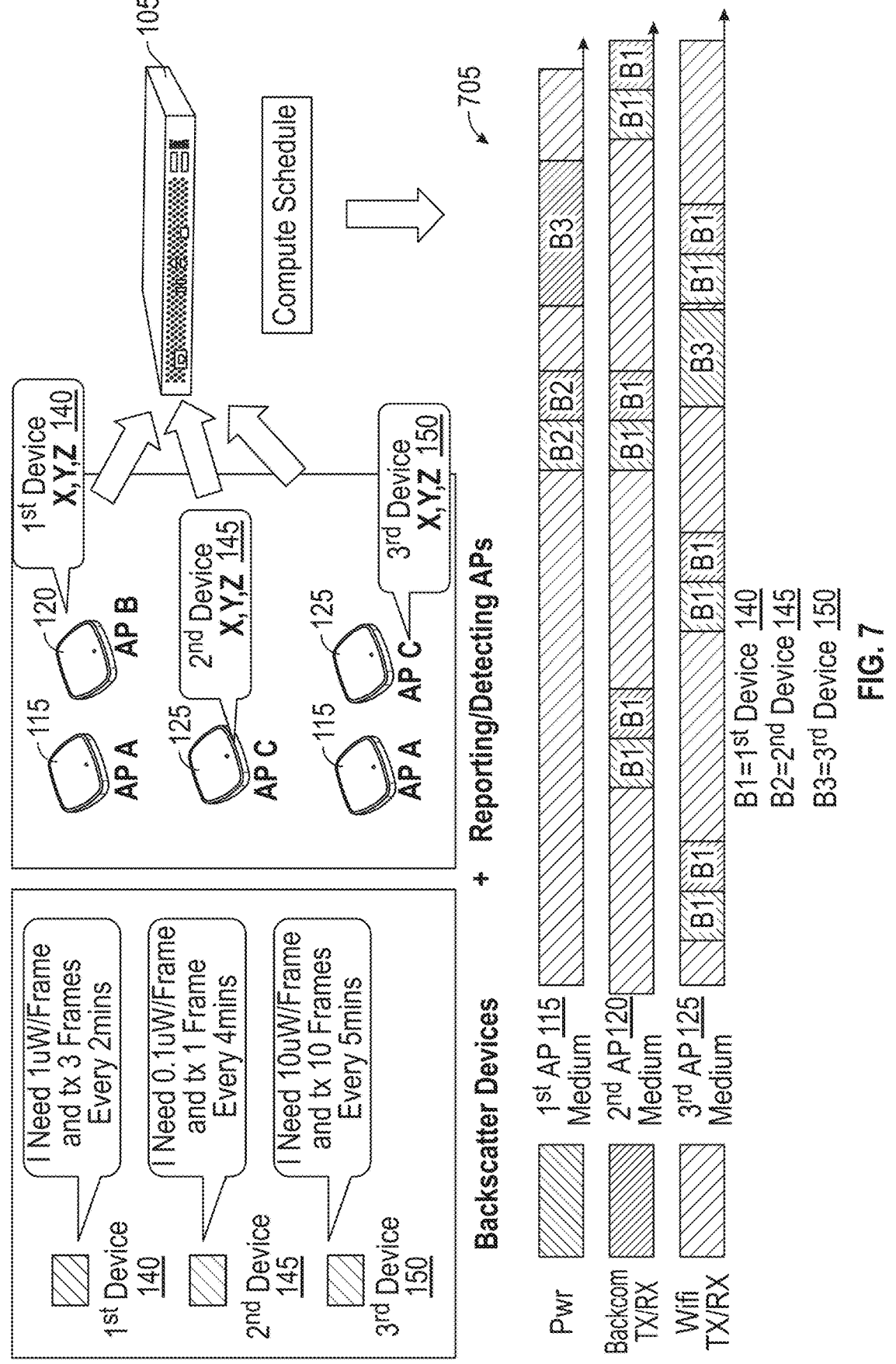
FIG. 7 illustrates a network controller responsible for creating a time schedule.

Method 600 may begin at starting block 605 and proceed to stage 610 where computing device 1000 may receive a plurality of device data respectively associated with a first plurality of devices (e.g., first plurality of devices 130) in a preterminal space (e.g., coverage environment 110). For example, controller 105 may be responsible for creating a time schedule for operations according to backscatter communication device needs and network policies. As shown in FIG. 7, device data for first device 140 may comprise that it needs 1 µW/frame and TX 3 frames every 2 min., device data for second device 145 may comprise that it needs 0.1 µW/frame and TX 1 frames every 4 min., and device data for third device 150 may comprise that it needs 10 µW/frame and TX 10 frames every 5 min. One or more of the plurality of APs may detect and send the plurality of device data to controller 105.

From stage 610, where computing device 1000 receives the plurality of device data respectively associated with the first plurality of devices (e.g. first plurality of devices 130) in the preterminal space (e.g., coverage environment 110), method 600 may advance to stage 620 where computing device 1000 may receive a plurality of locations respectively associated with the first plurality of devices (e.g. first plurality of devices 130) in the preterminal space (e.g., coverage environment 110). For example, as shown in FIG. 7, second AP 120 may detect the coordinates of first device 140 and report it to controller 105. Third AP 125 may detect the coordinates of second device 145 and third device 150 and report it to controller 105.

Once computing device 1000 receives the plurality of locations respectively associated with the first plurality of devices (e.g. first plurality of devices 130) in the preterminal space (e.g., coverage environment 110) in stage 620, method 600 may continue to stage 630 where computing device 1000 may communicate, based on the plurality device data and the plurality of locations, with the first plurality of devices (e.g. first plurality of devices 130) in the preterminal space (e.g., coverage environment 110) and with a second plurality of devices (e.g. second plurality of devices 135) in the preterminal space (e.g., coverage environment 110). Communicating may further comprise coordinating the communication to minimize cross-interference between the first plurality of devices (e.g., first plurality of devices 130) and the second plurality of devices (e.g., second plurality of devices 135). For example, controller 105 may create a schedule 705 to manage backscattering signal reading by making sure no Wi-Fi devices are using the RF medium at the time a backscatter communication device is transmitting on the RF medium. Once computing device 1000 communicates, based on the plurality device data and the plurality of locations, with the first plurality of devices (e.g., first plurality of devices 130) in the preterminal space (e.g., coverage environment 110) and with the second plurality of devices (e.g., second plurality of devices 135) in the preterminal space (e.g., coverage environment 110) in stage 630, method 600 may then end at stage 640.

Figure 8:
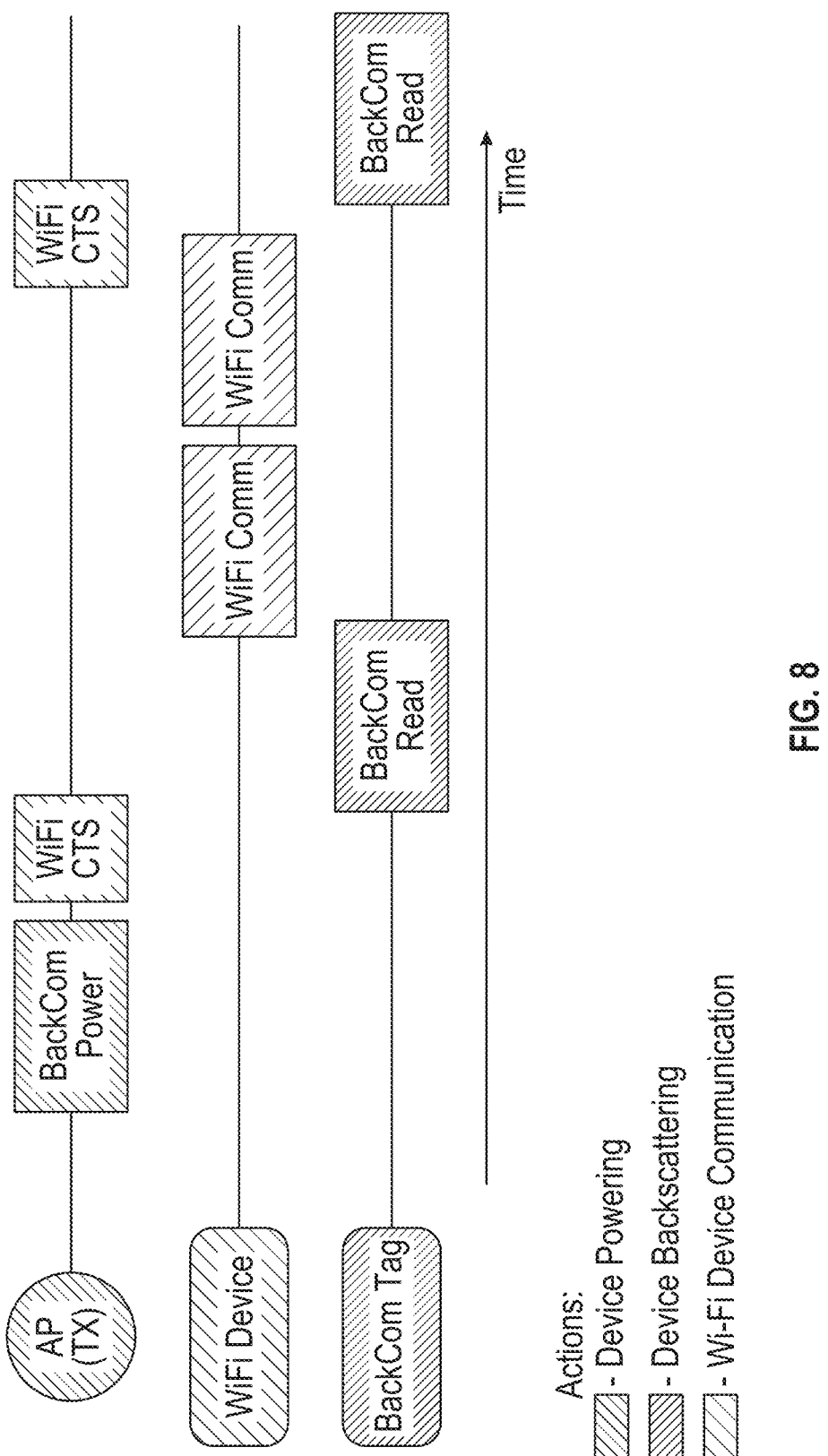
FIG. 8 illustrates an AP responsible for managing backscattering signal reading.

FIG. 8 illustrates reducing interference and allowing backscattered signals to be received. The plurality of APs may be coordinated centrally (i.e., managed infrastructure) so that AP neighbors may have no conflicting actions happening at the same time. A conflicting action may comprise listening for a backscattering signal while transmitting some power or doing Wi-Fi communication. Wi-Fi device communication may also be some sort of device powering in a more passive way. Therefore, those two actions may be seen as similar. In the embodiment of FIG. 8, the AP may be responsible for managing backscattering signal reading by making sure no Wi-Fi devices are using the RF medium at that time. In one variation of this embodiment, this may be done by issuing a Clear to Send (CTS) frame. Therefore, it may be the APs that are dictating the different communication slots. Backscattering communication devices, through special frame, may indicate to a given AP the need for more time or more power. By doing so, the AP may adjust the schedule to maximize the read success of backscattering communication devices.

With other embodiments, some backscattering communication devices may not be able to or may not want to share their transmission and power needs. The inherently slow nature of backscatter communications may allow the managed network to recognize that a backscatter communication is going on and adapt to it by triggering Radio Resource Management (RRM) or illuminating the area. This may work by using the monitoring capabilities of the APs that may recognize that an unscheduled backscatter communication is ongoing, report to controller 105, that in turns adapts power and time allocation of close by APs to support (or contrast) the communication according to configured management policies.

In another embodiment, an objective function to maximize may be defined so that the role of an AP may be dynamically chosen to maximize the Signal-to-Noise Ratio (SNR) of backscattering devices and Wi-fi devices:

$$f((AP_0, \ldots, AP_n)) =$$
$$\sum_{i \in Wifi\,clients} AP_i SNR(\text{Client}_i) + \sum_{j \in BackCom\,dev\,j} AP_j SNR(BackCom\,dev_j)$$

where:

AP$_i$ denote the AP to be used for a client i (Wi-Fi or backscattering device); and AP$_i$SNR(x) denotes the SNR computed on given AP$_i$ for provided client.

Figure 9A:
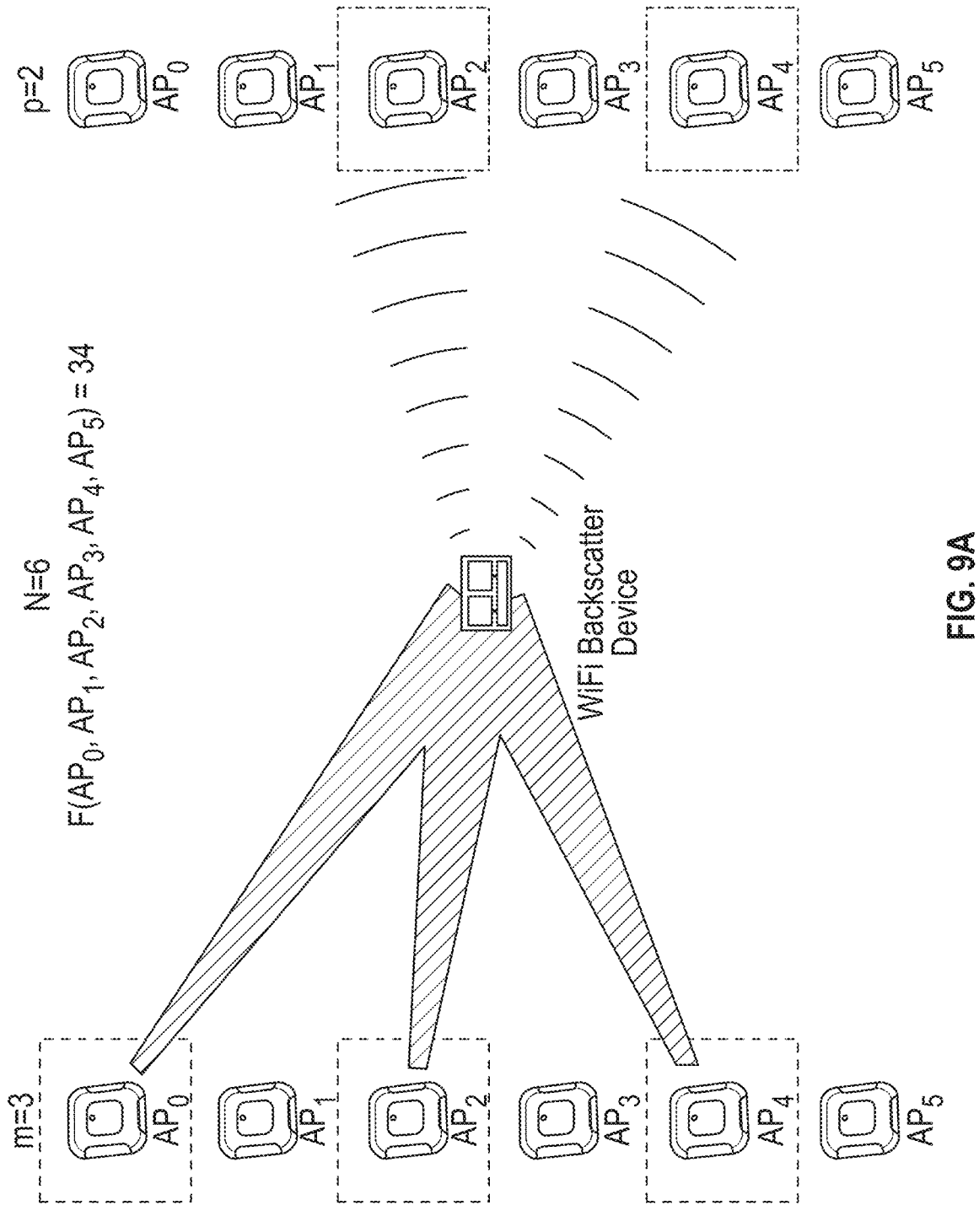
FIGS. 9A and 9B illustrate an objective function to maximize Signal-to-Noise Ratio (SNR)
Figure 9B:
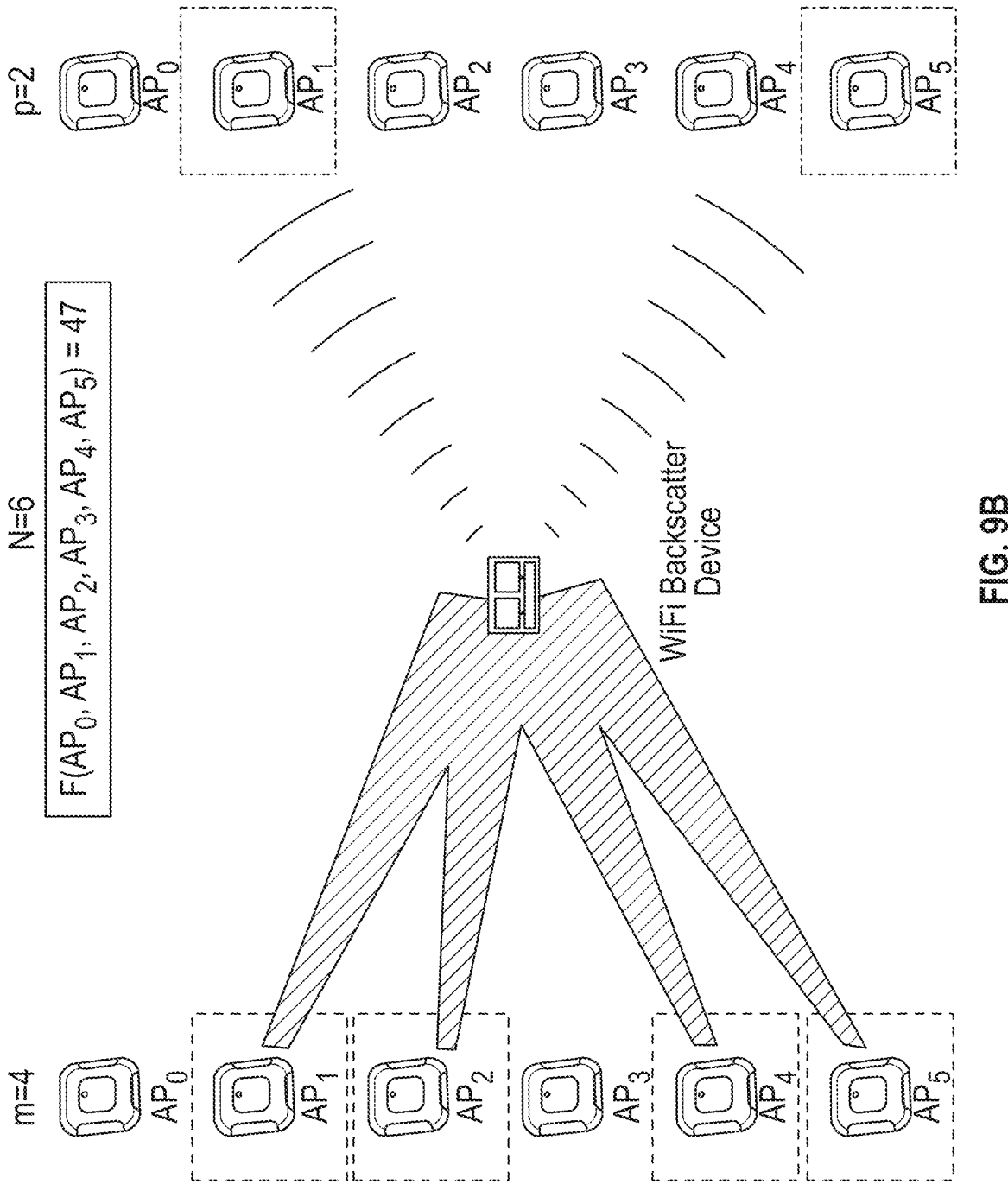

The role of an AP may be: i) to send power to backscattering communication devices; ii) perform Wi-Fi communication; iii) sense backscattered signals. This may work iteratively as follows. A subset of APs may be selected for powering a backscattering communication device, for Wi-Fi communication, and for listening to backscattered signals as illustrated by FIG. 9A. SNR of received Wi-Fi signals and received backscattered signal may be received and the objective function may be computed. Another set of APs may be chosen to maximize the objective functions. Eventually this iterative process may yield a better set of APs as illustrated by FIG. 9B (e.g., f increases from 34 of FIG. 9A to 47 of FIG. 9B).

In other embodiments, a combination of the following processes may be used to minimize interference in a managed network. Adaptive Space Division Multiple Access (SDMA) and Adaptive Frequency Division Multiple Access (FDMA) may be used. With adaptive SDMA and FDMA, not only are different sub-bands provided in which a backscatter communication device may backscatter an incoming signal, but these sub-bands may also be chosen depending on the physical location of: i) the energy transmitter (e.g., AP TX); ii) the backscatter device; and iii) the receiver (e.g., AP RX). This may extend to dedicated radios servicing backscatter devices in certain scenarios, by exploiting the multi-radio capabilities of APs.

In addition, Wi-Fi-coupled adaptive beam forming may be used. With Wi-Fi-coupled adaptive beam forming, network infrastructure may be programmed to either alternate service between classical Wi-Fi and backscatter support or to use Wi-Fi client traffic as an energy source for backscatter communication devices. In this latter option, the WLC may slightly adapt beamforming parameters in order to extend beams for clients to close by backscatter communication devices.

Furthermore, hybrid communication may be sued. With hybrid communication, in some use cases, it may be desired to have reliable communication while having an extreme battery life. For that purpose, some devices may be battery powered. This way they may have two ways of communicating: i) passive using backscattering only; and ii) active using energy from the battery with less need of energy coming from wireless medium. In those cases, infrastructure may determine which devices to switch from passive to active depending on some Key Performance Indicators (KPIs), centrally managed.

With the above embodiments, there may be multiple use cases that may be solved in different ways, depending on requirements, KPIs, etc. For one given set of constraints for a given use case, the solution may be formulated to the separate and reception problem as an optimization problem.

Furthermore, consistent with embodiments of the disclosure, the reader of the backscatter communication device may use the information received to determine a sense of location (near the backscatter communication). The amount of energy that is sent to the backscatter communication device may be controlled and tuned to refine the sense of location.

Figure 10:
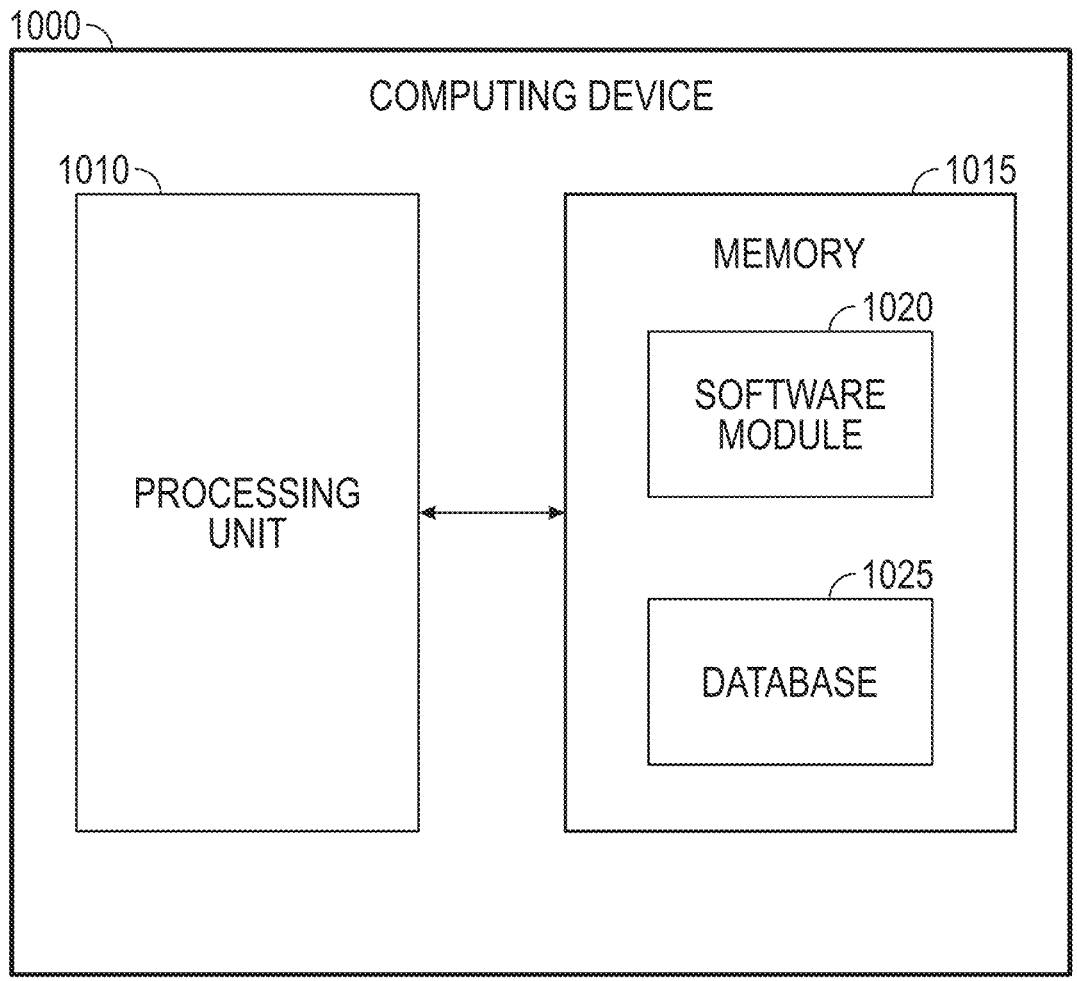
FIG. 10 is a block diagram of a computing device.

FIG. 10 shows computing device 1000. As shown in FIG. 10, computing device 1000 may include a processing unit 1010 and a memory unit 1015. Memory unit 1015 may include a software module 1020 and a database 1025. While executing on processing unit 1010, software module 1020 may perform, for example, processes for providing radio discovery for a mesh AP as described above with respect to FIG. 2. Computing device 1000, for example, may provide an operating environment for controller 105, first AP 115, second AP 120, third AP 125, first device 140, second device 145, third device 150, first client device 155, second client device 160, and third client device 165. Controller 105, first AP 115, second AP 120, third AP 125, first device 140, second device 145, third device 150, first client device 155, second client device 160, and third client device 165 may operate in other environments and are not limited to computing device 1000.

Computing device 1000 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 1000 may comprise any computer operating environment, such as hand-held devices, multiprocessor systems, microprocessor-based or programmable sender electronic devices, minicomputers, mainframe computers, and the like. Computing device 1000 may also be practiced in distributed computing environments where tasks are performed by remote processing devices. The aforementioned systems and devices are examples and computing device 1000 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 1000 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving a plurality of device data respectively associated with a first plurality of devices in a preterminal space;

receiving a plurality of locations respectively associated with the first plurality of devices in the preterminal space;

communicating, based on the plurality device data and the plurality of locations, with the first plurality of devices in the preterminal space and with a second plurality of devices in the preterminal space, wherein communicating further comprises coordinating communication to minimize cross-interference between the first plurality of devices and the second plurality of devices, and wherein coordinating communication to minimize cross-interference comprises insuring that a radio medium for any Access Point (AP) is not being used by any of the second plurality of devices when any of the first plurality of devices are transmitting on the radio medium;

determining which APs of a plurality of APs are to be used in communicating with a one of the first plurality of devices based on an iterative process that maximizes a Signal-to-Noise (SNR) ratio of the first plurality of devices and the second plurality of devices, wherein determining which APs of a plurality of APs are to be used in communicating with a one of the first plurality of devices comprises:

determining which first APs of the plurality of APs to be used for powering the one of the first plurality of devices, determining which second APs of the plurality of APs to be used for Wi-Fi communication, determining which third APs of the plurality of APs to be used for listening to signals from the one of the first plurality of devices, and maximizing the SNR of the first plurality of devices and second plurality of devices based on the SNR of Wi-Fi communication signals and signals from the one of the first plurality of devices.

2. The method of claim 1, wherein insuring is performed by a controller.

3. The method of claim 1, wherein insuring is performed by an AP.

4. The method of claim 1, wherein the first plurality of devices comprise backscatter devices.

5. The method of claim 1, wherein the first plurality of devices comprise energy harvesting devices.

6. The method of claim 1, wherein the first plurality of devices comprise a combination of backscatter devices and energy harvesting devices.

7. The method of claim 1, wherein the second plurality of devices comprise wireless devices.

8. The method of claim 1, wherein the second plurality of devices comprises Wi-Fi devices.

9. A method comprising:

monitoring for an unscheduled communication from a device;

reporting the unscheduled communication to a controller; and allocating, by the controller, an Access Point (AP) to support the unscheduled communication according to configured management policies, wherein allocating the AP to support the unscheduled communication comprises:

adapting, by the controller, power and time allocation of a nearby AP to the device to support the unscheduled communication from the device, and adapting, by the controller, power and time allocation of another nearby AP to the device to contrast the unscheduled communication from the device.

10. The method of claim 9, wherein the device comprises one of a backscatter device and an energy harvesting device.

11. The method of claim 9, wherein monitoring for the unscheduled communication from the device comprises monitoring for the unscheduled communication from the device using monitoring capabilities of APs.

12. A system comprising:

a memory storage; and a processing unit disposed in a controller and coupled to the memory storage, wherein the processing unit is operative to:

receive a report of an unscheduled communication from a device; and allocate an Access Point (AP) to support the unscheduled communication according to configured management policies, wherein allocating the AP to support the unscheduled communication comprises:

adapt power and time allocation of a nearby AP to the device to support the unscheduled communication from the device, and adapt power and time allocation of another nearby AP to the device to contrast the unscheduled communication from the device.

13. The system of claim 12, wherein the device comprises one of a backscatter device and an energy harvesting device.

14. The system of claim 12, wherein monitoring capabilities of APs are used to monitor for the unscheduled communication from the device.

* * * * *